US010396643B2

(12) United States Patent
Suzuki et al.

(10) Patent No.: US 10,396,643 B2
(45) Date of Patent: Aug. 27, 2019

(54) MOTOR

(71) Applicant: Minebea Mitsumi Inc., Nagano (JP)

(72) Inventors: Tomohisa Suzuki, Hamamatsu (JP);
Yutaka Kamogi, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 80 days.

(21) Appl. No.: 15/825,228

(22) Filed: Nov. 29, 2017

(65) Prior Publication Data

US 2018/0152088 A1 May 31, 2018

(30) Foreign Application Priority Data

Nov. 30, 2016 (JP) ................................. 2016-233306

(51) Int. Cl.
| | | |
|---|---|---|
| *H02K 29/08* | (2006.01) | |
| *H02K 29/12* | (2006.01) | |
| *H02K 11/215* | (2016.01) | |
| *H02P 6/16* | (2016.01) | |
| *H02K 1/27* | (2006.01) | |
| *H02K 5/22* | (2006.01) | |

(52) U.S. Cl.
CPC ........... *H02K 29/08* (2013.01); *H02K 11/215* (2016.01); *H02K 29/12* (2013.01); *H02K 1/2733* (2013.01); *H02K 5/225* (2013.01); *H02P 6/16* (2013.01)

(58) Field of Classification Search
CPC ..... H02K 11/30; H02K 13/006; H02K 15/022
See application file for complete search history.

(56) References Cited

U.S. PATENT DOCUMENTS

| | | | | |
|---|---|---|---|---|
| 2005/0269895 | A1* | 12/2005 | Innami ................. | B62D 5/0403 310/429 |
| 2008/0211357 | A1* | 9/2008 | Kataoka ............... | H02K 11/215 310/68 B |
| 2012/0025662 | A1* | 2/2012 | Takahashi .............. | H02K 1/148 310/215 |

FOREIGN PATENT DOCUMENTS

JP          2016-193662 A     11/2016

* cited by examiner

*Primary Examiner* — Jermele M Hollington
*Assistant Examiner* — Alvaro E Fortich
(74) *Attorney, Agent, or Firm* — Pearne & Gordon LLP (57) ABSTRACT

A motor includes a rotational shaft, a bearing supporting the rotational shaft, a magnet including plural magnetic poles in a circumferential direction, a rotor core disposed inside the magnet, and a magnetic sensor. The magnet includes a projection portion projecting toward a side of the bearing with respect to the rotor core in a direction of the rotational shaft. The magnetic sensor is positioned between the rotor core and the bearing in the direction of the rotational shaft and is positioned inside an inner peripheral surface of the projection portion.

10 Claims, 10 Drawing Sheets

MOTOR

CROSS REFERENCE TO RELATED APPLICATIONS

This application claims the benefit of Japanese Patent Application No. 2016-233306, filed Nov. 30, 2016, which is hereby incorporated by reference in its entirety.

BACKGROUND

Technical Field

The present disclosure relates to a motor, and particularly, a motor to detect the position of a rotor using a magnetic sensor.

BACKGROUND

In a motor, the rotational position (rotational angle) of a rotor is detected using a magnetic sensor such as a Hall element, for example.

Japanese Patent Application Laid-Open No. 2016-193662 describes the structure of a motor formed to be provided with a projection portion projecting from a stator core in the axial direction of a shaft, in a magnet of a rotor portion, and to detect the rotational position of the magnet by a Hall element disposed on a resin member of a stator portion facing the projection portion in a radial direction.

SUMMARY

By the way, in the above motor described in Japanese Patent Application Laid-Open No. 2016-193662, the Hall element is disposed just above a coil. Therefore, the Hall element is easily influenced by a magnetic flux generated from the coil, and in some cases, it is difficult to detect the rotational position of the rotor with a high accuracy.

The present disclosure is related to providing a motor capable of detecting a rotational position of a rotor.

In accordance with one aspect of the present disclosure, a motor includes: a rotational shaft; a bearing supporting the rotational shaft; a magnet including plural magnetic poles in a circumferential direction; a rotor core disposed inside the magnet; and a magnetic sensor, in which the magnet includes a projection portion projecting toward a side of the bearing with respect to the rotor core in a direction of the rotational shaft, and the magnetic sensor is positioned between the rotor core and the bearing in the direction of the rotational shaft and is positioned inside an inner peripheral surface of the projection portion.

Preferably, the rotor core is a magnetic body, and a detection surface of the magnetic sensor should face the inner peripheral surface of the projection portion.

Preferably, the detection surface of the magnetic sensor is positioned between the projection portion and the rotational shaft.

Preferably, the magnetic sensor is at a position away from an end portion of the projection portion and the bearing in the direction of the rotational shaft.

Preferably, the magnetic sensor detects a magnetic flux in a radial direction of the magnet.

Preferably, the motor includes: a holder supporting the magnetic sensor; and a housing accommodating a bracket, the bracket supporting the bearing. The holder and the bracket are lined in the direction of the rotational shaft.

Preferably, the magnetic sensor includes a terminal unit extending in the direction of the rotational shaft, and the terminal unit of the magnetic sensor is attached to the holder.

Preferably, the motor includes a conduction terminal to be electrically connected with an exterior, the conduction terminal is attached to the holder.

Preferably, the holder is formed with a single member.

Preferably, the motor includes plate-like members including a conductive property. The plate-like members are electrically connected with the plural terminals. The terminal unit of the magnetic sensor includes plural terminals, and the respective plural plate-like members in the holder are disposed and lined in the direction of the rotational shaft.

According to the present disclosure, it is possible to provide a motor capable of detecting the rotational position of the rotor.

DETAILED DESCRIPTION

Hereinafter, motors in embodiments of the present disclosure will be described.

In the following description, the coordinates shown in the drawings are common among the drawings. The Z-direction of the coordinates is a rotational shaft direction (a direction parallel to a rotational shaft) of a motor. The X-direction is a direction perpendicular to the rotational shaft direction. The Y-direction is a direction perpendicular to the rotational shaft direction and is a direction perpendicular to the X-direction. In the following description, the Z-direction is sometimes referred to as a vertical direction (a positive direction on the Z-axis with respect to the origin is an upward direction). Herein, "vertical", "upward", "downward" and the like are expressions employed for convenience sake in the case of focusing on only the motor, and do not limit at all the direction of an apparatus equipped with the motor and the attitude of the motor in use.

Embodiments

Figure 1:
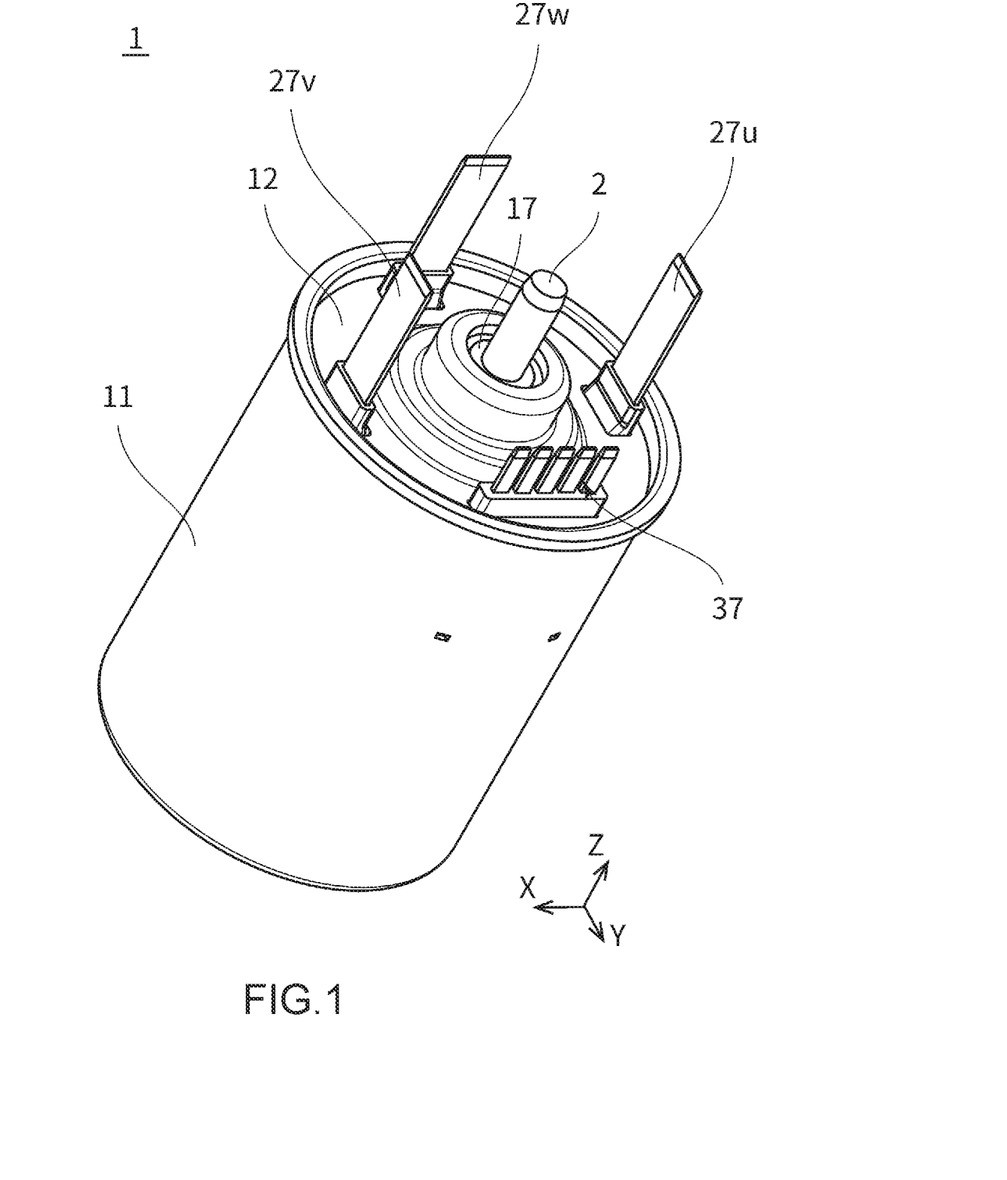
FIG. 1 is a perspective view showing a motor in one of embodiments of the present disclosure.
Figure 2:
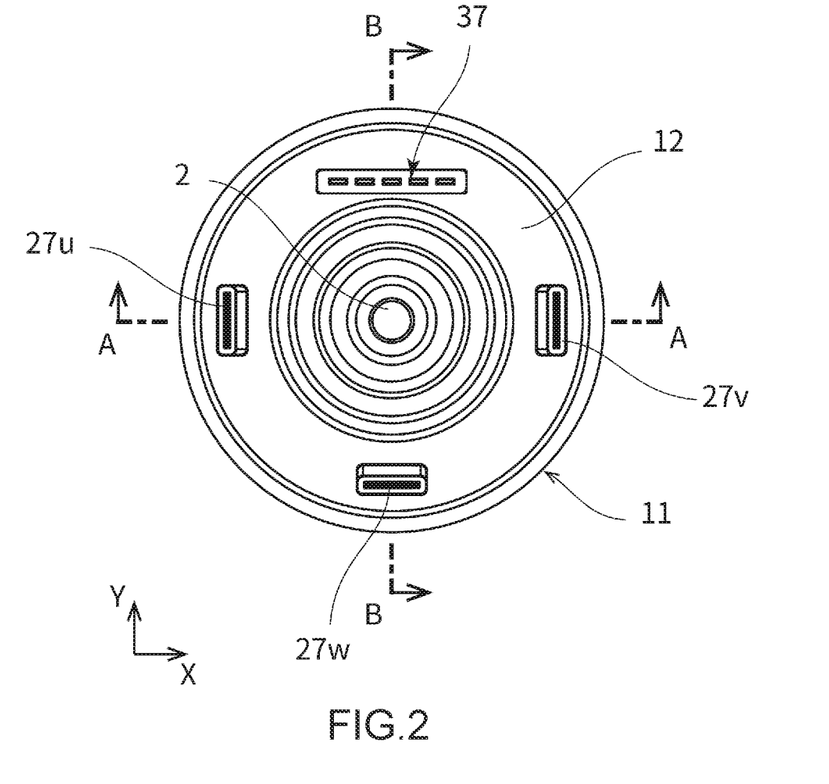
FIG. 2 is a plan view of a motor 1.

FIG. 1 is a perspective view showing a motor 1 in one of embodiments of the present disclosure. FIG. 2 is a plane view of the motor 1.

As shown in FIG. 1, the motor 1, as a whole, includes a portion having a columnar outer shape, the height direction of the shape is the rotational shaft direction, and a rotational shaft 2 projecting from the columnar portion. The rotational shaft 2 projects upward from a bracket 12 on an upper surface of the columnar portion of the motor 1. From the projecting portion of the rotational shaft 2, driving power of the motor 1 can be taken.

The motor 1 is a so-called inner-rotor type brushless motor.

On the bracket 12 of the motor 1, three conduction terminals 27 (27u, 27v, 27w) and a sensor terminal unit 37 are provided. In the sensor terminal unit 37, for example, five terminal strips are disposed so as to be lined in the X-direction. Each of the conduction terminals 27 projects upward from the bracket 12. The sensor terminal unit 37 projects upward from the bracket 12. As shown in FIG. 2, the sensor terminal unit 37, the conduction terminal 27v, the conduction terminal 27w and the conduction terminal 27u, in this order, are disposed at positions equally spaced around the rotational shaft 2 as viewed from the upper side. The conduction terminal 27u and the conduction terminal 27v are disposed so as to be lined in the X-direction, such that the rotational shaft 2 is put between the conduction terminal 27u and the conduction terminal 27v. The conduction terminal 27w and the sensor terminal unit 37 are disposed so as to be lined in the Y-direction, such that the rotational shaft 2 is put between the conduction 27w and the sensor terminal unit 37. The conduction terminal is a terminal capable of supplying electric power.

Figure 3:
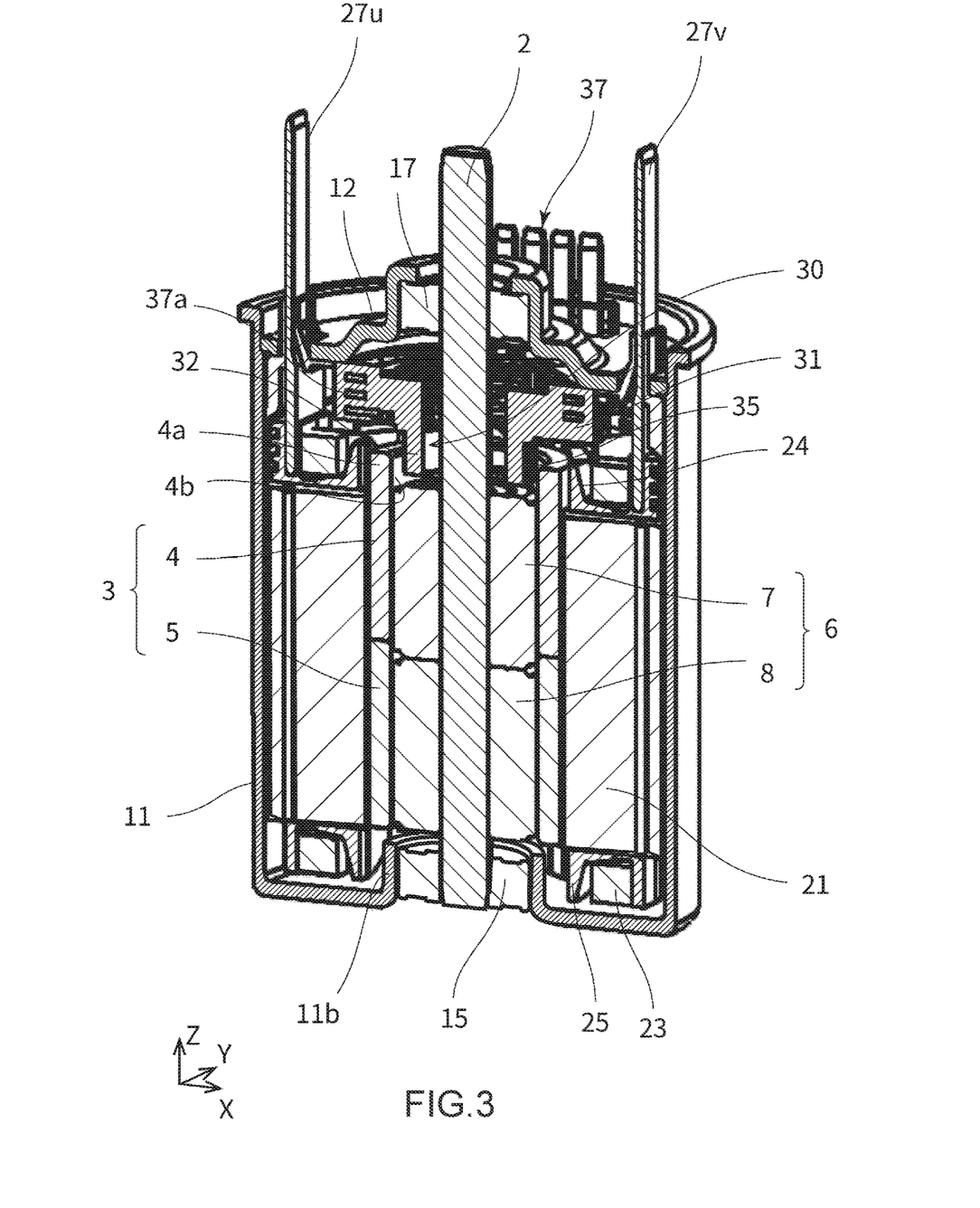
FIG. 3 is a perspective, cross-sectional view of the motor, which shows a cross section taken from line A-A in FIG. 2.
Figure 4:
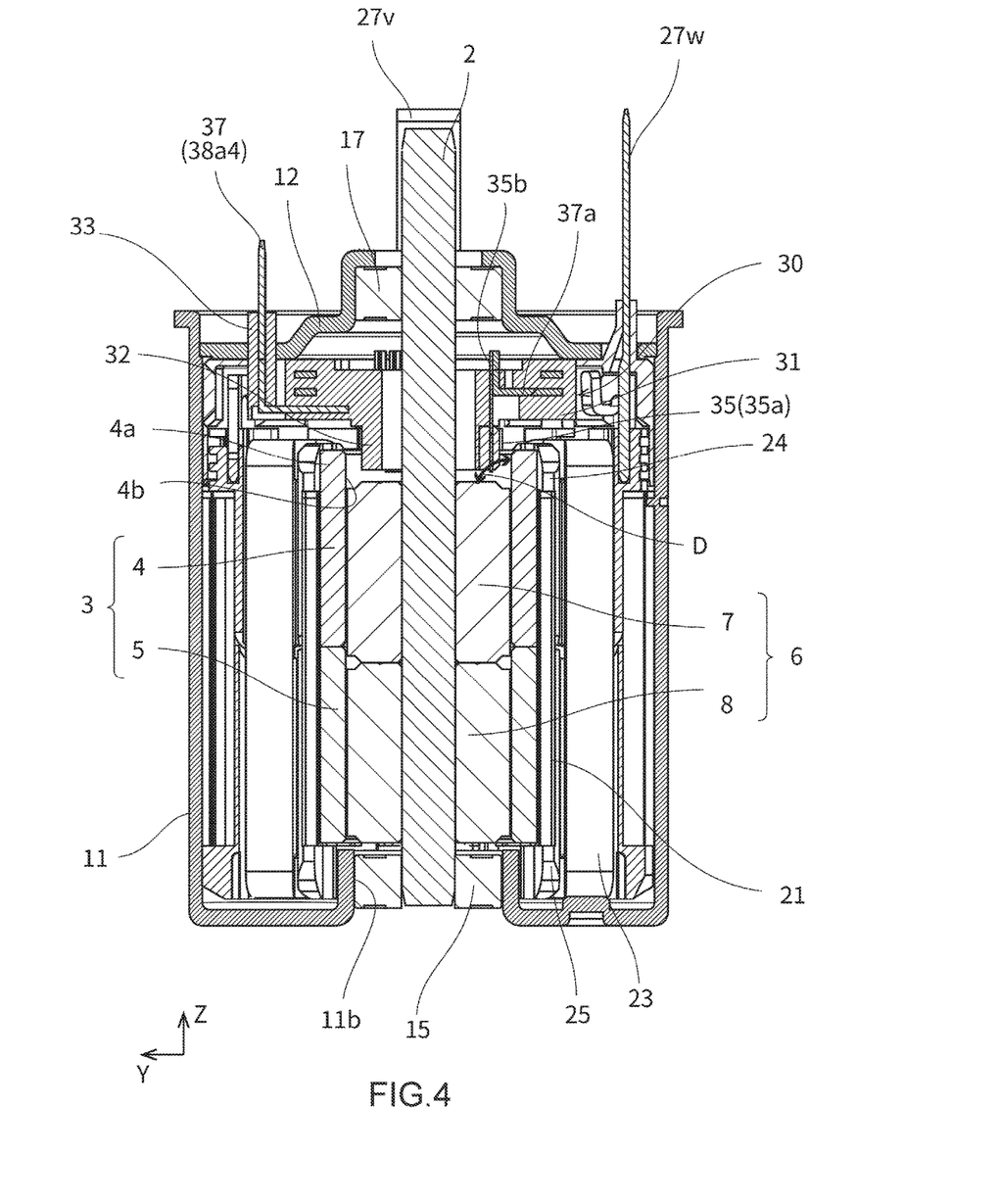
FIG. 4 is a cross-sectional view taken from line A-A in FIG. 2.
Figure 5:
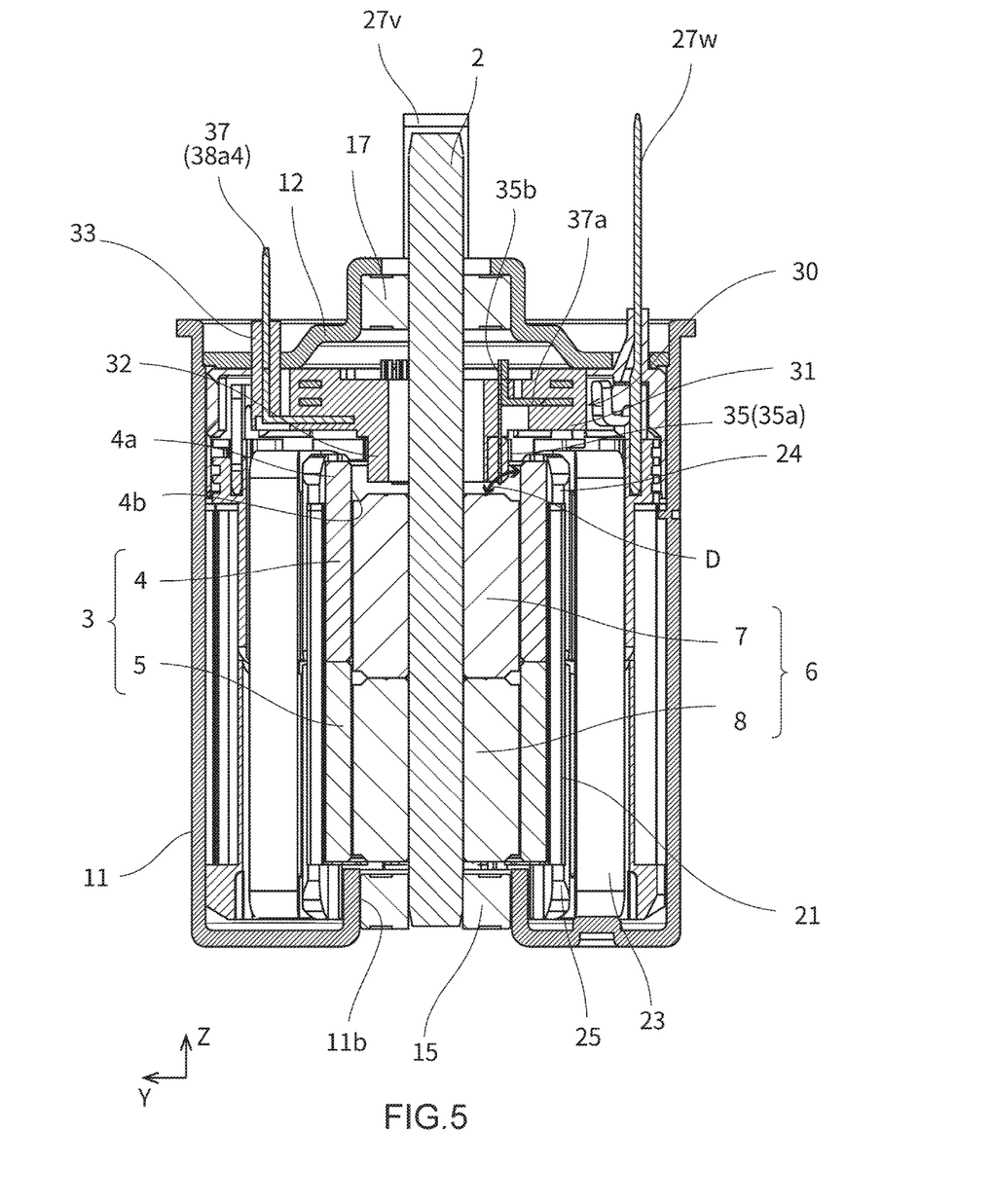
FIG. 5 is a cross-sectional view taken from line B-B in FIG. 2.

FIG. 3 is a perspective, cross-sectional view of the motor 1, showing a cross section taken from line A-A in FIG. 2. FIG. 4 is a cross-sectional view taken from line A-A in FIG. 2. FIG. 5 is a cross-sectional view taken from line B-B in FIG. 2.

As shown in FIG. 3, the motor 1, roughly, has a structure of disposing each member in the interior of a housing 11 in a bottomed cylindrical shape having an opening portion at an upper end portion, and closing the opening portion of the housing 11 by the bracket 12 having a plate shape. The bracket 12 is accommodated in the housing 11 such that a circumference portion of the bracket 12 is fixed to an edge portion near the opening portion of the housing 11. In the interior of the housing 11, a magnet 3, a rotor core 6, a bearing 15 provided on a lower end portion side (hereinafter, referred to as a bearing on a lower side), a bearing 17 provided on an upper end portion side (hereinafter, referred to as a bearing on an upper side), a stator core 21, a coil 23, insulators 24, 25 and a holder 30 are disposed.

The bearing 15 on the lower side is attached to the center of a bottom portion of the housing 11. A lower end portion of the rotational shaft 2 is inserted into an inner ring of the bearing 15. The bearing 15 on the lower side is fixed to the housing 11, by a folded portion 11b provided at the bottom portion of the housing 11. The folded portion 11b is formed by folding a part of the bottom portion of the housing 11 toward the interior of the housing 11. The folded portion 11b has a cylindrical shape allowing the bearing 15 on the lower side to be accommodated.

The bearing 17 on the upper side is attached to the bracket 12 such that an outer ring is press-fitted to a cavity formed at a central portion of the bracket 12. The rotational shaft 2 is press-fitted to an inner ring of the bearing 17.

Each of the bearing 15 on the lower side and the bearing 17 on the upper side supports the rotational shaft 2 in a rotatable manner. Since the rotational shaft 2 is supported by the bearings 15, 17, a rotor including the rotational shaft 2, the magnet 3 and the rotor core 6 can rotate with respect to the housing 11 of the motor 1 and a stator fixed to the housing 11.

The magnet 3 and the rotor core 6 are attached to the rotational shaft 2. The magnet 3 is annularly disposed, and the rotor core 6 is disposed inside the magnet 3. In the present embodiment, the rotor core 6 has an outer periphery shape with a cylindrical surface. The magnet 3 has a cylindrical shape, and is fixed to the rotor core 6 so as to surround an outer periphery of the rotor core 6.

For example, the rotor core 6 is fixed to the rotational shaft 2 in a state of being press-fitted to the rotational shaft 2. For example, the magnet 3 is bonded and fixed to the rotor core 6. Here, the method of the fixation of the rotor core 6 to the rotational shaft 2 and the method of the fixation of the magnet 3 to the rotor core 6 are not limited to this, and publicly known methods can be employed.

In the present embodiment, each of the magnet 3 and the rotor core 6 is vertically divided into two members. That is, on the upper side of the motor 1, a magnet 4 and a rotor core 7 inside the magnet 4 are disposed. On the lower side of the motor 1, a magnet 5 and a rotor core 8 inside the magnet 5 are disposed. The magnet 4 and the magnet 5 are vertically lined with a slight gap, and the rotor core 7 and the rotor core 8 are vertically lined with a slight gap.

The magnet 3 has plural magnetic poles in the circumferential direction. Magnetic poles adjacent in the circumferential direction are different from each other. The magnet 3 is an isotropic bond magnet, for example, but is not limited to this. The magnet 3 may be a polar-anisotropic magnet, for example.

In the present embodiment, the rotor core 6 is a magnetic body. Specifically, the rotor core 6 is an iron core formed with an iron member, for example.

In the present embodiment, the magnet 4 on the upper side (on the side of the bracket 12) has a projection portion 4a projecting toward the side of the bearing 17 on the upper side in the rotational shaft direction relative to the rotor core 6. In other words, the length of the magnet 3 in the rotational shaft direction is longer than the length of the rotor core 6 in the rotational shaft direction, and the respective lower end portions of the magnet 3 and the rotor core 6 are at nearly the same position in the rotational shaft direction. Therefore, the magnet 3 has a site positioned above the upper end portion of the rotor core 6 in the rotational shaft direction, and this site is the projection portion 4a. The projection portion 4a has a cylindrical shape having a similar thickness to another site of the magnet 4. Since such a projection portion 4a is provided, the magnet 3 has an inner peripheral surface 4b not facing an outer peripheral surface of the rotor core 6, in the range of the projection portion 4a. That is, the magnet 3 has the projection portion 4a having the inner peripheral surface 4b facing itself.

The stator core 21 forms a stator, together with the coil 23 and the insulators 24, 25. The stator core 21 is formed by laminating plural thin plates such as iron plates, each of the thin plates includes plural teeth. An outer peripheral portion of the stator core 21 is fixed to an inner peripheral surface of the housing 11. An upper surface and lower surface of the stator core 21 and surfaces of each tooth are covered with the insulator 24 disposed from the upper side of the stator core 21 and the insulator 25 disposed from the lower side. The coil 23 is wound around each tooth, through the insulators 24, 25. In the present embodiment, six teeth are provided, and the coil 23 is connected with the conduction terminals 27 (27u, 27v, 27w) so as to be driven in three phases. Each conduction terminal 27 is a metal plate, for example. Each conduction terminal 27 is fixed to the insulator 24 so as to extend upward from the insulator 24, and pierces through the bracket 12.

The holder 30 is formed such that the rotational shaft 2 pierces through a nearly central portion of the holder 30, and supports a magnetic sensor 35. The holder 30 is a member made of a resin, for example. The holder 30 formed with a resin member insulates plural terminals of the magnetic sensor 35 described later and the plural terminals of the sensor terminal unit 37 from each other. The holder 30 and the bracket 12 are lined in the rotational shaft direction. The holder 30 is disposed at a position closer to the bearing 17 on the upper side with respect to the rotor core 6 and the stator, that is, at a position between the stator and the bearing 17.

Figure 6:
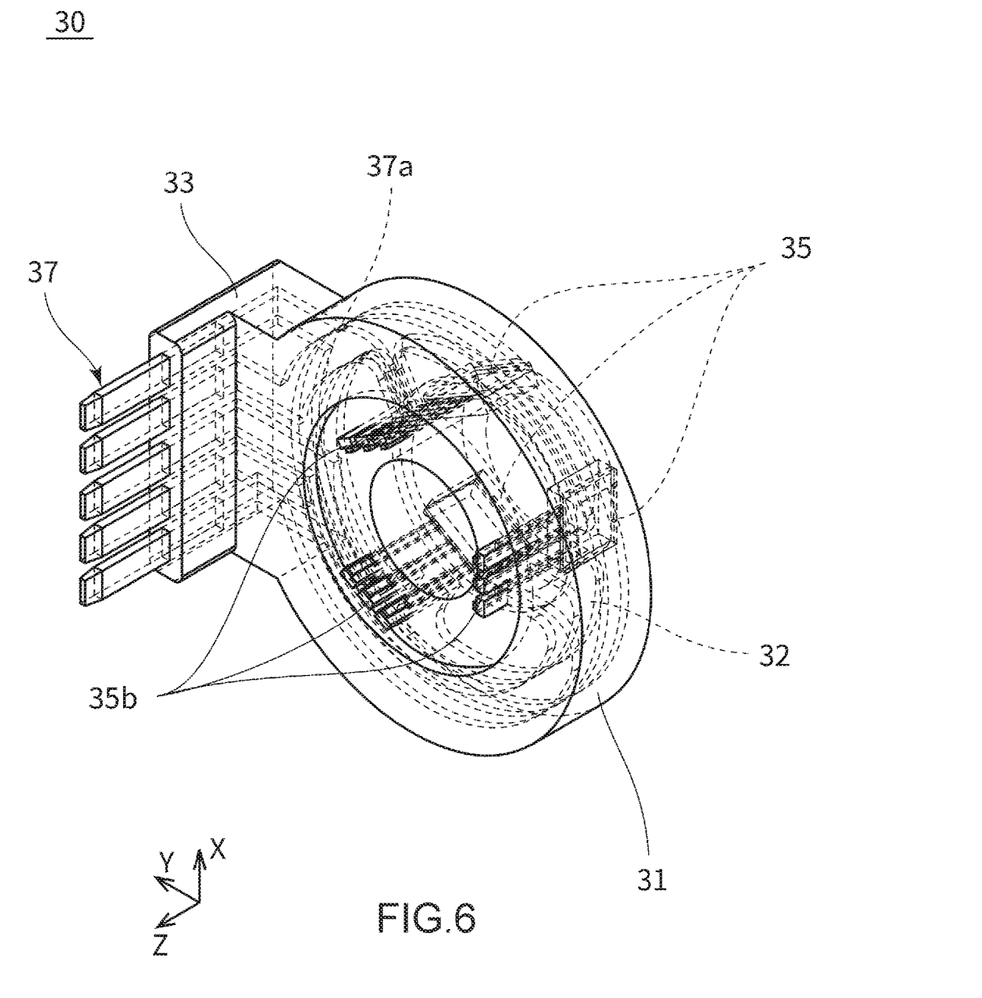
FIG. 6 is a perspective view of a holder.
Figure 7:
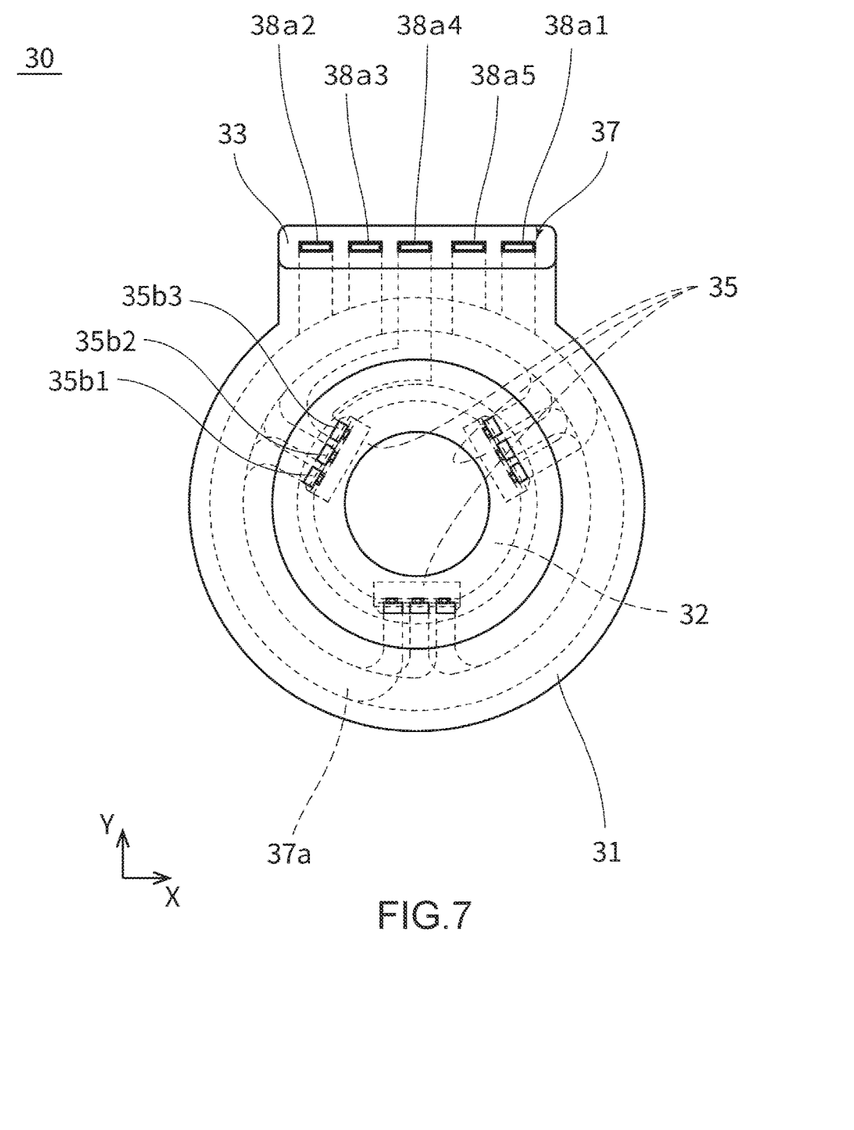
FIG. 7 is a plan view of the holder.
Figure 8:
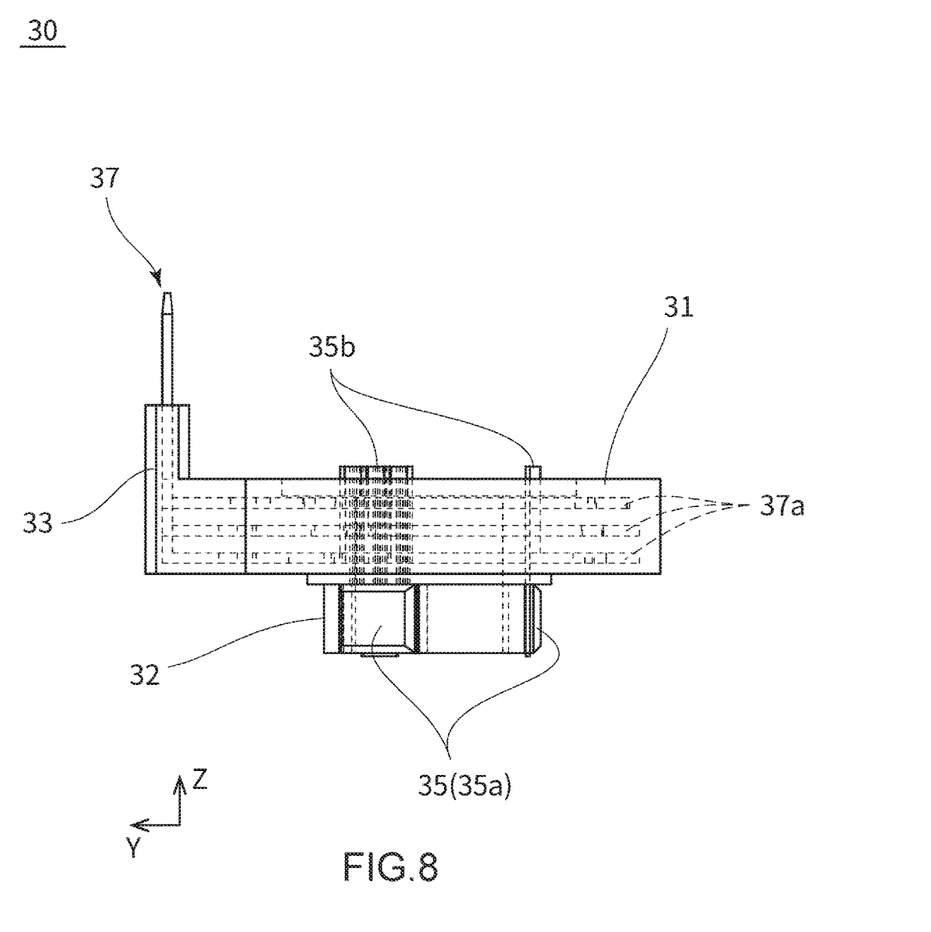
FIG. 8 is a side view of the holder.

FIG. 6 is a perspective view of the holder 30. FIG. 7 is a plan view of the holder 30. FIG. 8 is a side view of the holder 30.

As shown in FIG. 6, FIG. 7 and FIG. 8, in the present embodiment, the holder 30 includes a discoidal portion 31 having a larger outer diameter than the outer diameter of the magnet 3, and a projection portion 32 (hereinafter, referred to as a holder projection portion 32) in a cylindrical shape projecting downward from the discoidal portion 31. In the discoidal portion 31, a part of the sensor terminal unit 37 is buried. Hereinafter, this part of the sensor terminal unit 37 is referred to as a buried portion 37a. The sensor terminal unit 37 is a terminal unit for external connection provided in the holder 30 for connecting terminal portions 35b of the magnetic sensor 35 with the exterior separately from the terminal portions 35b of the magnetic sensor 35. The buried portion 37a may be formed with a plate-like member having a conductive property and electrically connecting the sensor terminal unit 37 and the plural terminals 35b of the magnetic sensor 35. In this case, plural plate-like members having a conductive property and electrically connected with the plural terminals included in the sensor terminal unit 37 respectively are in the holder 30, and the plural plate-like members are disposed so as to be lined in the rotational shaft direction. The holder projection portion 32 has a smaller outer diameter than the outer diameter of the rotor core 6. That is, the holder projection portion 32 has a smaller outer diameter than the diameter of the inner peripheral surface 4b of the projection portion 4a. Here, the holder projection portion 32 may have another shape, without being limited to the cylindrical shape.

A holding portion 33 (hereinafter, referred to as a terminal holding portion 33) projecting upward is formed on a part of the discoidal portion 31 of the holder 30. The holder 30 is held by the bracket 12 such that the terminal holding portion 33 pierces through the bracket 12, and thereby, is attached to the bracket 12. The terminal unit 37 (hereinafter, referred to as the sensor terminal unit 37) of the magnet sensor 35 is led out from the interior of the motor 1 to the upper side of the bracket 12 through the interior of the terminal holding portion 33. The conduction terminals 27 electrically connected to the exterior are attached to the holder 30, and supported by the terminal holding portion 33.

In the present embodiment, plural magnetic sensors 35 are provided. Specifically, for example, three magnetic sensors 35 are provided. The magnetic sensor 35 is a Hall element, for example. The magnetic sensor 35 has a detection surface 35a capable of detecting magnetism. The magnetic sensor 35 includes the terminals 35b extending in the rotational shaft direction. The terminals 35b extend upward, that is, toward the bracket 12. The terminals 35b of the magnetic sensor 35 are attached to the holder 30.

The sensor terminal unit 37 includes five terminals 38a1, 38a2, 38a3, 38a4, 38a5. One terminal 38a1 included in the sensor terminal unit 37 is connected with one terminal 35b (35b1) of the three magnetic sensors 35, through the buried portion 37a. Further, another terminal 38a2 is connected with another terminal 35b (35b2) of the three magnetic sensors 35, through the buried portion 37a. Further, other three terminals 38a3, 38a4, 38a5 are connected with one terminals 35b (35b3) of the three magnetic sensors 35, respectively, through the buried portion 37a. The terminals 35b3 are a terminal for a signal, that is, for outputting a signal from the magnetic sensor 35 to the exterior. The buried portion 37a for the terminals is divided into three layers different in the position in the rotational shaft direction, and is formed to keep a mutually insulated state. That is, portions of terminals forming the buried portion 37a for the terminals are disposed so as to be lined in the rotation shaft direction. In this way, using the holder 30, the magnetic sensors 35 are held, and the wiring from the magnetic sensors 35 to the sensor terminal unit 37 is performed. Therefore, it is possible to perform the wiring without using a circuit board and the like. It is possible to perform the wiring work in advance, separately from a process of attaching the magnetic sensors 35 to the motor 1, and therefore, it is possible to simplify the assembly process for the motor 1.

Back to FIG. 3, FIG. 4 and FIG. 5, the magnetic sensor 35 is positioned in an interspace between the rotor core 6 and the bearing 17 in the rotational shaft direction. Specifically, the magnetic sensor 35 is at a position away from the end portion of the projection portion 4a and the bearing 17 in the rotational shaft direction. In other words, the magnetic sensor 35 is positioned below the upper end portion of the projection portion 4a. The magnetic sensor 35 is positioned inward of the inner peripheral surface 4b of the projection portion 4a. Further, the magnetic sensor 35 is disposed such that the detection surface 35a faces the inner peripheral surface 4b of the projection portion 4a. In other words, the magnetic sensor 35 is disposed in an interspace between the projection portion 4a and the rotational shaft 2, in an orientation allowing magnetic force lines emitted from the magnet 3 in the radial direction to pass through the detection surface 35a of the magnetic sensor 35. The magnetic sensor 35 detects the magnetic field or magnetic force of the magnet 3 in the radial direction.

Figure 9:
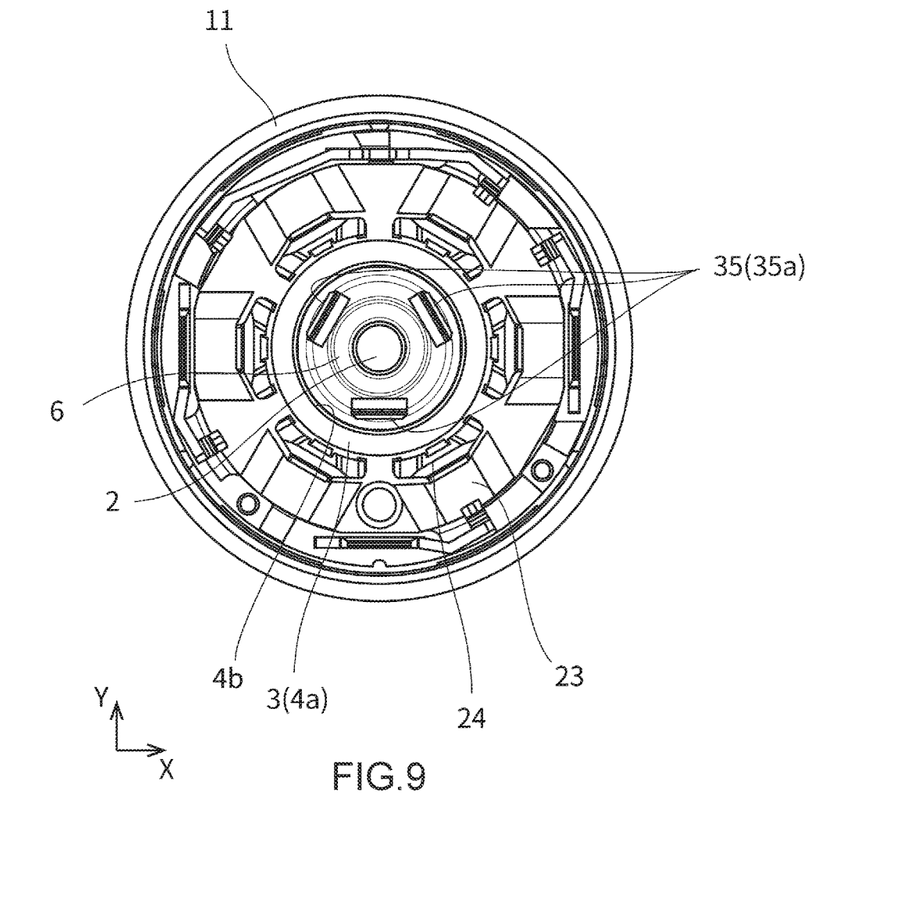
FIG. 9 is a plan view showing the internal structure of the motor.

FIG. 9 is a plan view showing the internal structure of the motor 1.

In FIG. 9, the illustration of the bracket 12, the holder 30, the terminals and the like attached to the bracket 12 is omitted except the magnetic sensors 35.

As shown in FIG. 9, the three magnetic sensors 35 are disposed at a nearly equal interval around the rotational shaft 2 (at an interval of 120 degrees about the rotational shaft 2). Each magnetic sensor 35 is disposed such that the detection surface 35a is oriented in the radially outward direction so that the detection surface 35a faces the inner peripheral surface 4b of the projection portion 4a of the magnet 3.

Figure 10:
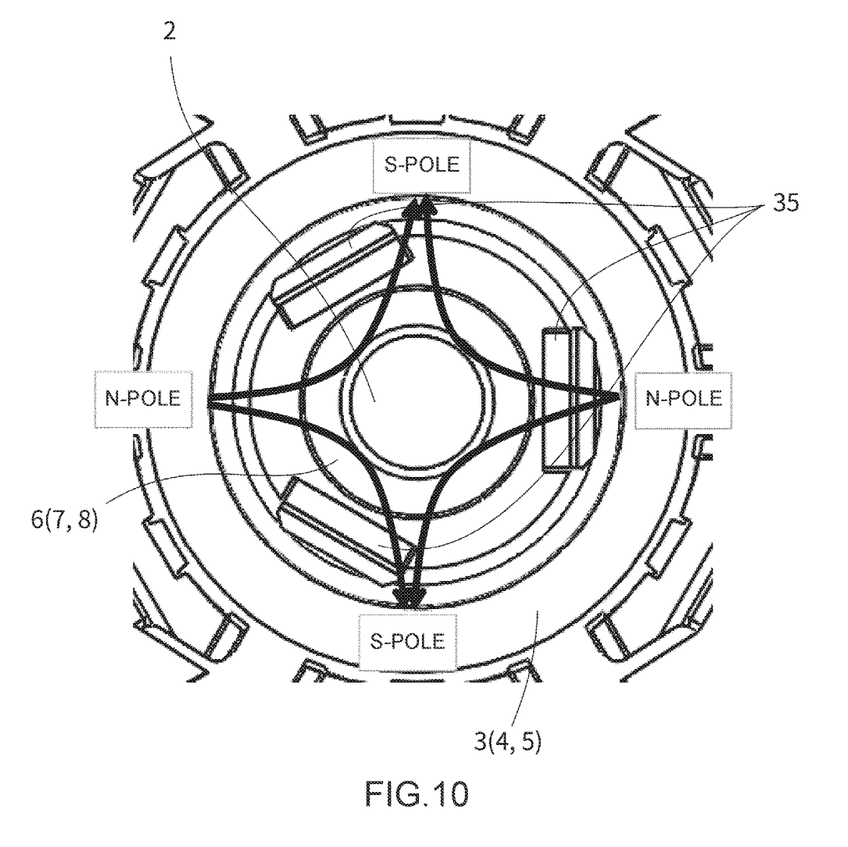
FIG. 10 is a diagram showing orientations of magnetic fluxes of a magnet on a plane in the motor.

FIG. 10 is a diagram showing magnetic force lines generated from the magnet on a plane in the motor 1.

FIG. 10 shows the magnetic force lines generated from the magnet 3 (4, 5), together with the plane in the motor 1 in FIG. 2. The magnet 3 has plural magnetic poles in the circumferential direction. As the magnetic poles of the magnet 3, specifically, N-poles and S-poles are alternately lined. The magnetic force lines run from one magnetic pole of the two magnetic poles toward another adjacent magnetic pole. The magnetic sensors 35 are disposed in a region accommodating such plural magnetic force lines. Since the detection surface 35a of the magnetic sensor 35 is disposed so as to be oriented in the radially outward direction so that the detection surface 35a faces the inner peripheral surface 4b of the projection portion 4a of the magnet 3, the magnetic sensors 35 can efficiently detect the magnitude of the magnetic field generated from the magnet 3.

The motor 1 is formed as described above, and therefore, can perform the following.

Generally, in the case where a Hall element is used as the magnetic sensor in an inner-rotor type brushless motor, a magnetic field of 50 mT (millitesla) or higher is necessary for accurately detecting the rotational angle of the rotor. Therefore, it is necessary to obtain a strong magnetic field strength by disposing the magnetic sensor as close to the magnet as possible. However, the space in the interior of the motor is limited, leading to a problem in that it is difficult to secure a place allowing the magnetic sensor to be disposed such that a strong magnetic field strength is obtained in this way.

In response, in the present embodiment, the projection portion 4a overhung above an upper end surface of the rotor core 6 is provided in the magnet 4, and the magnetic sensor 35 is disposed such that the detection surface 35a is close to the inner peripheral surface 4b of the projection portion 4a. Since the magnetic sensor 35 is at a position away from the coil 23, the magnetic sensor 35 is unlikely to be influenced by a magnetic flux emitted from the coil 23. Accordingly, by the magnetic sensor 35, it is possible to detect the rotational position of the rotational shaft 2 with a high accuracy. Further, it is not necessary to increase the size of the motor 1 so as to dispose the magnetic sensor 35 close to the magnet 3, therefore, it is possible to decrease the size of the motor 1 relatively. Since the magnetic sensor 35 is disposed in an area where the change in the magnetic flux density distribution in the axial direction is relatively small, the detection amount of the magnetic flux is stable even when the magnetic sensor 35 vibrates in the axial direction due to the vibration or the like. Accordingly, the reliability of the detection result of the rotational position of the rotational shaft 2 increases.

[Others]

The rotor core may be another magnetic body. Further, the rotor core may be formed with a non-magnetic body. In the case where the rotor core is formed with a non-magnetic body, for example, a polar-anisotropic magnet can be used as the magnet. That is, even when a magnetic path is generated from the magnet in the circumferential direction, the magnetic sensor can detect the magnetic field or magnetic force passing through the magnetic sensor in the radial direction, by disposing the magnetic sensor close to the inner peripheral surface of the projection portion of the magnet.

In the motor, the number of poles, the number of layers, the number of slots and the like are not limited to the above-described embodiment. Further, as the magnetic sensor, various sensors can be used.

The holder may be fixed to another portion such as the housing, instead of the bracket. Further, the holder does not always need to be used. Further, the holder may be formed with a single member, and the member may be formed with a publicly known material such as a resin.

The magnetic sensor may be disposed at a position close to the bearing on the lower side in the above-described embodiment. In this case, the projection portion of the magnet may project toward the bearing on the lower side, and the detection surface of the magnetic sensor may be disposed so as to be oriented to the inner peripheral surface.

In the above embodiment, a spring is not provided, but a coil spring may be disposed nearly coaxially with the rotational shaft 2, such that the rotational shaft 2 passes through the coil spring. In this case, the coil spring is disposed in an interspace between the bearing 15 on the lower side and the rotor core 8 on the lower side. The coil spring biases the rotor core 8 in a direction away from the bearing 15. Here, instead of the coil spring, another type of spring may be adopted, and the spring may be disposed at a different position.

It should be understood that the above embodiment is an example and is not limitative in all respects. The scope of the present disclosure is intended to be defined not by the above description but by the claims, and to include all modifications in meanings and scopes equivalent to the claims.

What is claimed is:

1. A motor comprising:
a rotational shaft;
a bearing supporting the rotational shaft;
a magnet including plural magnetic poles in a circumferential direction;
a rotor core disposed inside the magnet; and
a magnetic sensor, wherein
the magnet includes a projection portion projecting toward a side of the bearing with respect to the rotor core in a direction of the rotational shaft, and
the magnetic sensor is positioned between the rotor core and the bearing in the direction of the rotational shaft and is positioned inside an inner peripheral surface of the projection portion.

2. The motor according to claim 1, wherein
the rotor core is a magnetic body, and
a detection surface of the magnetic sensor faces the inner peripheral surface of the projection portion.

3. The motor according to claim 2, wherein
the detection surface of the magnetic sensor is positioned between the projection portion and the rotational shaft.

4. The motor according to claim 3, wherein
the magnetic sensor is at a position away from an end portion of the projection portion and the bearing in the direction of the rotational shaft.

5. The motor according to claim 4, wherein
the magnetic sensor detects a magnetic flux in a radial direction of the magnet.

6. The motor according to claim 1, comprising:
a holder supporting the magnetic sensor; and
a housing accommodating a bracket, the bracket supporting the bearing, wherein
the holder and the bracket are lined in the direction of the rotational shaft.

7. The motor according to claim 6, wherein
the magnetic sensor includes a terminal unit extending in the direction of the rotational shaft, and
the terminal unit of the magnetic sensor is attached to the holder.

8. The motor according to claim 7, comprising a conduction terminal to be electrically connected with an exterior, wherein
the conduction terminal is attached to the holder.

9. The motor according to claim 8, wherein
the holder is formed with a single member.

10. The motor according to claim 7, comprising
plate-like members including a conductive property, wherein
the plate-like members are electrically connected with the plural terminals, and
the terminal unit of the magnetic sensor includes plural terminals, and the respective plural plate-like members in the holder are disposed and lined in the direction of the rotational shaft.

\* \* \* \* \*